United States Patent
Nihas et al.

(10) Patent No.: US 11,687,582 B2
(45) Date of Patent: Jun. 27, 2023

(54) AUTOMATED IMAGE-BASED INVENTORY RECORD GENERATION SYSTEMS AND METHODS

(71) Applicant: Shopify Inc., Ottawa (CA)

(72) Inventors: Guduru Sai Nihas, Ottawa (CA); Salim Batlouni, Ottawa (CA)

(73) Assignee: Shopify Inc., Ottawa (CA)

( * ) Notice: Subject to any disclaimer, the term of this patent is extended or adjusted under 35 U.S.C. 154(b) by 373 days.

(21) Appl. No.: 17/004,159

(22) Filed: Aug. 27, 2020

(65) Prior Publication Data
US 2022/0067085 A1 Mar. 3, 2022

(51) Int. Cl.
| | |
|---|---|
| G06F 16/583 | (2019.01) |
| G06F 16/51 | (2019.01) |
| G06Q 10/0875 | (2023.01) |
| G06T 7/00 | (2017.01) |
| G06T 7/10 | (2017.01) |
| G06V 20/20 | (2022.01) |
| G06V 20/62 | (2022.01) |

(52) U.S. Cl.
CPC .......... *G06F 16/5846* (2019.01); *G06F 16/51* (2019.01); *G06F 16/5862* (2019.01); *G06Q 10/0875* (2013.01); *G06T 7/0002* (2013.01); *G06T 7/10* (2017.01); *G06V 20/20* (2022.01); *G06V 20/63* (2022.01); *G06T 2207/20132* (2013.01)

(58) Field of Classification Search
CPC ............................................. G06F 16/25–5862
See application file for complete search history.

(56) References Cited

U.S. PATENT DOCUMENTS

| | | | |
|---|---|---|---|
| 10,762,330 B2* | 9/2020 | Adato | G06Q 10/06311 |
| 2011/0216179 A1* | 9/2011 | Dialameh | G09B 21/008 |
| | | | 348/E7.085 |
| 2014/0111542 A1* | 4/2014 | Wan | G06F 18/41 |
| | | | 345/633 |
| 2017/0031904 A1* | 2/2017 | Legrand | G06F 16/34 |
| 2021/0312533 A1* | 10/2021 | Luo | G06Q 20/3267 |

* cited by examiner

*Primary Examiner* — Robert W Beausoliel, Jr.
*Assistant Examiner* — Nirav K Khakhar
(74) *Attorney, Agent, or Firm* — Rowand LLP

(57) ABSTRACT

Methods and systems for automatically creating item records for physical items. The method may include receiving an image obtained using an image sensor; detecting a physical item in the image; extracting item data regarding the physical item by applying image analysis to the image; determining, using the extracted item data, whether a memory contains an item record for the physical item; and, when no item record for the physical item exists in the memory, generating and storing in the memory a new item record for the physical item in association with the extracted item data.

20 Claims, 10 Drawing Sheets

AUTOMATED IMAGE-BASED INVENTORY RECORD GENERATION SYSTEMS AND METHODS

FIELD

The present disclosure relates to inventory record systems and, in particular, to methods and systems for automatically generating inventory records based on images.

BACKGROUND

There are many contexts in which an inventory of physical items is maintained, where each physical item of a specific type has an associated item record that provides details regarding the physical item. Examples include a retail store with details of individual items available for purchase, a warehouse with a large inventory of items, a library with a catalog of printed and/or electronic materials, or the like.

In a large system with hundreds or thousands of physical items, building the database of item records can be tedious, time-consuming and, as a result, error-prone. This is the case when initially building the catalog of item records for an existing inventory and when processing changes (especially frequent ones) to inventory holdings. In some systems, not only is item identifying data required for an inventory record, but an associated image of the item may be recommended or necessary, such as in the case of an online retail inventory. Devices equipped to obtain quality item images are rarely the same as the devices for convenient text entry for entering product item details.

BRIEF DESCRIPTION OF THE DRAWINGS

Embodiments will be described, by way of example only, with reference to the accompanying figures wherein.

DETAILED DESCRIPTION

Figure 1:
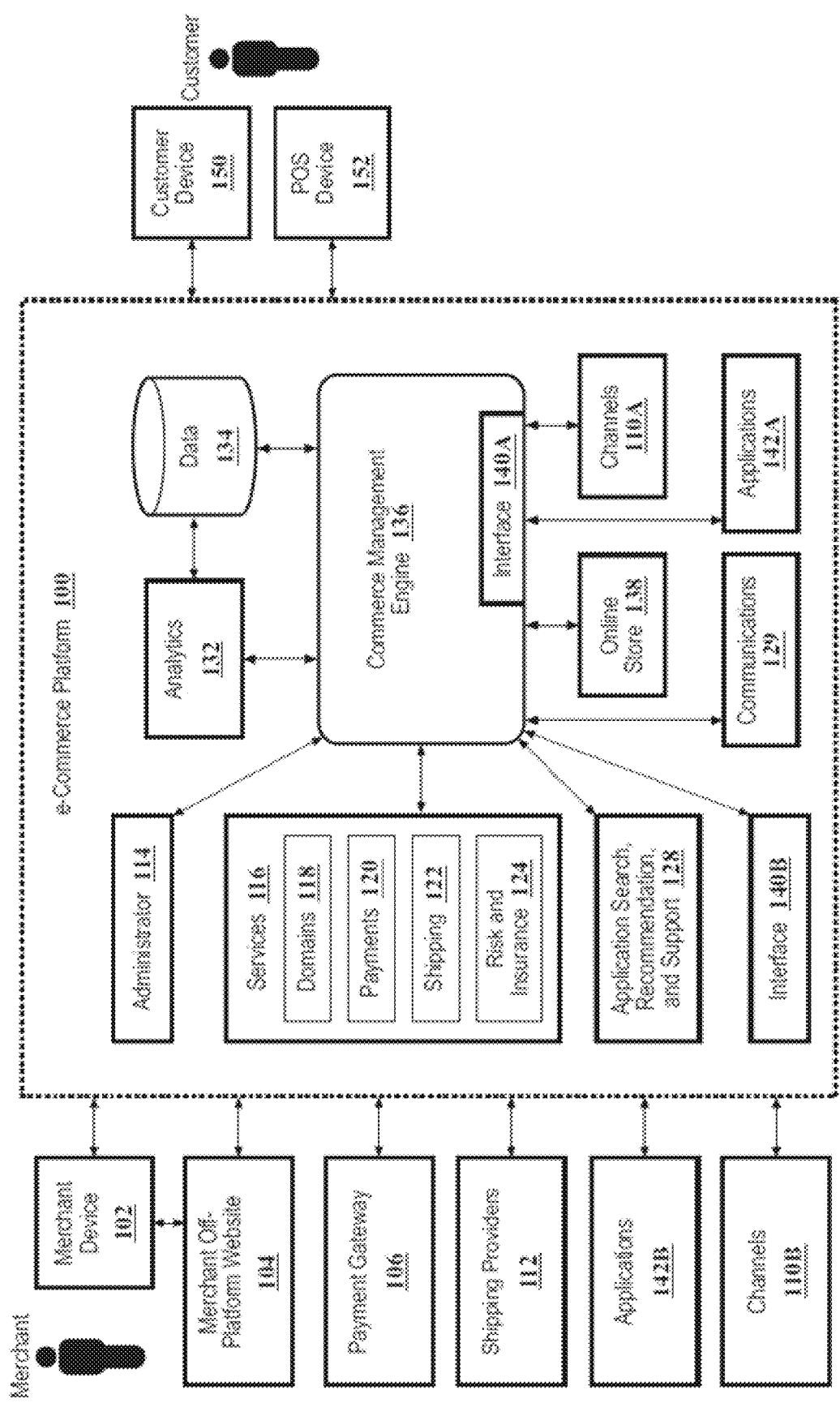
FIG. 1 is a block diagram of an e-commerce platform, according to one embodiment.

In one aspect, the present application describes a computer-implemented method for automatically creating item records for physical items. The method may include receiving an image obtained using an image sensor; detecting a physical item in the image; extracting item data regarding the physical item by applying image analysis to the image; determining, using the extracted item data, whether a memory contains an item record for the physical item; and, when no item record for the physical item exists in the memory, generating and storing in the memory a new item record for the physical item in association with the extracted item data.

In some implementations, the method may further include, when no item record for the physical item exists in the memory, outputting the new item record to a display screen in an edit mode to enable editing of the new item record.

In some implementations, detecting the physical item may include applying a feature detection algorithm to the image.

In some implementations, applying image analysis may include using text recognition with regard to a portion of the image within which the detected physical item is located.

In some implementations, applying image analysis may include using feature detection to identify in the image one or more of a brand, a sub-brand, a logo, a barcode, a size value, a weight value, a flavour, a barcode, a stock keeping unit, or a price, associated with the detected physical item, and extracting therefrom the item data.

In some implementations, detecting the physical item may include detecting two or more physical items in the image and carrying out the extracting, determining, and generating and storing in connection with each of the two or more physical items.

In some implementations, determining may include identifying a partial match between the extracted item data and an existing item record, determining that the detected physical item is a possible variant with regard to the existing item record. In some cases, determining that the detected physical item is a possible variant includes determining that extracted item data relating to brand matches the existing item record, but that at least one extracted item data relating to size, weight, or sub-brand, varies from the existing item record. In some cases, in response to determining that the detected physical item is a possible variant with regard to the existing item record, the method includes displaying a graphical user interface prompting input regarding whether the detected physical item is a possible variant with regard to the existing item record and, in response to received input, generating the new item record with a link to the existing item record and modifying the existing item record to link it to the new item record as variants. In some cases, based on the determination that the detected physical item is a possible variant with regard to the existing item record, generating the new item record may include generating the new item record with a link to the existing item record and modifying the existing item record to link it to the new item record as variants.

In some implementations, the method may further include cropping the image to obtain a sub-image containing the detected physical item, and storing the sub-image in association with the new item record. In some cases, the method further includes altering the sub-image to modify the background around the detected physical item.

In some implementations, receiving may include receiving a live view camera feed from the image sensor, and wherein the image is a frame of the live view camera feed. In some cases, the method also includes displaying the live view camera feed in real-time on the display, tracking the physical item in the live view camera feed, and overlaying graphical indicia identifying the detected physical item in the display of the live view camera feed. In some cases, extracting includes determining that sufficient item data has been extracted from the image to search the memory and, in response to determining that sufficient item data has been extracted, outputting a signal indicating that sufficient item data has been extracted. In some cases, extracting includes determining whether sufficient item data has been extracted from the image to search the memory and, in response to determining that sufficient item data has not been extracted, displaying a prompt to obtain additional image input regarding the detected physical item.

In some implementations, the image sensor and the memory are contained within a mobile computing device and the determining may include searching the memory on the mobile device.

In some implementations, the image sensor is contained within a mobile computing device and the memory is located on a remote server, and the determining may include sending a search query from the mobile computing device to the remote server and receiving a response message.

In another aspect, the present application describes a mobile computing device having an image sensor, one or more processors, and a processor-readable storage medium containing processor-executable instruction that, when executed by the one or more processors, are to cause the one or more processors to carry out the operations of one or more methods described herein.

In yet a further aspect, the present application describes a non-transitory computer-readable medium storing processor-executable instructions for automatically creating item records for physical items, wherein the instructions, when executed by one or more processors, are to cause the one or more processors to carry out the operations of one or more methods described herein.

For illustrative purposes, specific example embodiments will now be explained in greater detail below in conjunction with the figures.

Inventory Systems

In many contexts, an inventory of physical items is maintained, where each physical item of a specific type has an associated item record that provides details regarding the physical item. Examples include a retail store with details of individual items available for purchase, a warehouse with a large inventory of items, a library with a catalog of printed and/or electronic materials, or the like.

In a large system with hundreds or thousands of physical items, building the database of item records can be tedious, time-consuming and, as a result, error-prone. This is the case when initially building the catalog of item records for an existing inventory and when processing changes (especially frequent ones) to inventory holdings. In some systems, not only is item identifying data required for an inventory record, but an associated image of the item may be recommended or necessary, such as in the case of an online retail inventory. Devices equipped to obtain quality item images are rarely the same as the devices for convenient text entry for entering product item details.

As noted, an example of a large inventory system is an online retail environment, such as where a retailer may have hundreds, thousands, or even hundreds of thousands of product items available. Each product item may have associated item details, such as the name of the product (e.g. its "brand"), manufacturer, sub-brand (e.g. a flavour or other variation), packaging type, size, weight, price, or other such details. To create new product listings, for example when creating a new online store or to onboard a new retailer to an e-commerce platform, the item details for those items need to be input into item records to create the database of product items for that retailer. This is necessarily a long, cumbersome, and potentially error-prone process. Even with existing retailers, their product offerings may vary regularly as items are added or delisted.

Other contexts similarly involve problems with initial onboarding or maintenance of large inventories of product or physical items, including existing warehouse inventories, libraries, or other situations involving large inventories of physical items. The burden of generating the item records may deter some operators from creating a database of item records. Those that attempt onboarding may expend significant effort and produce a database containing a high percentage of erroneous records. Moreover, in those cases in which one or more images of the physical item are to accompany the item record the operator must obtain a digital image of the item and then attempt to transfer that image from an image capture device, such as a digital camera or mobile device, to the database and later attempt to have it associated with the item record that was created for the item. Alternatively, the operator is obliged to create the item record on the same device that captures the digital image, which device is typically not useful as a text input device for generating a large volume of item records.

The ecommerce platform for online retailing is only one example environment that will be used to illustrate some possible implementations with respect to the present application. The present application is not necessarily limited to e-commerce platforms or to multi-tenant e-commerce platforms, although they provide possible illustrative implementation examples in the present description. Accordingly, example operation and implementation of an e-commerce platform will be described below.

Example E-Commerce Platform

In some embodiments, the methods disclosed herein may be performed on or in association with an e-commerce platform. Therefore, an example of an e-commerce platform will be described.

FIG. 1 illustrates an e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers (or "purchasers") as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through channels 110A-B, through POS devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform), and the like. However, even these 'other' merchant commerce facilities may be incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In some embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In some embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In some embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In some embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In some embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g. as data 134). In some embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

Figure 2:
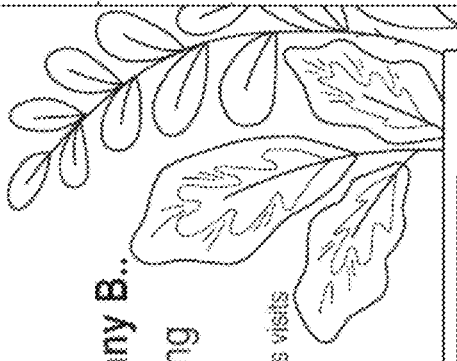
FIG. 2 is an example of a home page of an administrator, according to one embodiment.

FIG. 2 depicts a non-limiting embodiment for a home page of an administrator 114, which may show information about daily tasks, a store's recent activity, and the next steps a merchant can take to build their business. In some embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In some embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g. via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for the communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a platform payment facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's bank account (e.g., when using capital), and the like. These systems may have Sarbanes-Oxley Act (SOX) compliance and a high level of diligence required in their development and operation. The platform payment facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In some embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In some embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in some embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In some embodiments, an application 142A may be provided by the same party providing the platform 100 or by a different party. In some embodiments, an application 142B may be provided by the same party providing the platform 100 or by a different party. The commerce management engine 136 may be configured for flexibility and scalability through portioning (e.g., sharing) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, rather than violating the isolation principle, it may be preferred to move these components out of the commerce management engine 136 and into their own infrastructure within the e-commerce platform 100.

In some embodiments, the e-commerce platform 100 may provide for the platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through an application search, recommendations, and support platform 128 or system. In some embodiments, core products, core extension points, applications, and the administrator 114 may be developed to work together. For instance, application extension points may be built inside the administrator 114 so that core features may be extended by way of applications, which may deliver functionality to a merchant through the extension.

In some embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast growing marketplace. In some embodiments, partners, application developers, internal applications facilities, and the like, may be provided with a software development kit (SDK), such as through creating a frame within the administrator 114 that sandboxes an application interface. In some embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancellation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time.

In some embodiments, the e-commerce platform 100 may provide the application search, recommendation and support platform 128. The application search, recommendation and support platform 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In some embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In some embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In some embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In some embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the lifespan of a cart may be in the order of minutes, carts may be persisted to an ephemeral data store in some cases. However, in many implementations, while the customer session may only last minutes, the merchant and/or customer may wish to have the possibility of returning to a cart built in a previous session. Accordingly, the cart, e.g. the shopping cart data structure populated with product item data and a user identifier, may be stored in persistent memory on the platform 100.

In a typical session, a customer proceeds to checkout at some point after adding one or more items to their shopping cart. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer does not complete the transaction, the e-commerce platform 100 may retain the shopping cart data structure in memory so that the customer may return to the partially-completed cart in a subsequent session (e.g., in an abandoned cart feature).

Checkouts may calculate taxes and shipping costs based on the customer's shipping address. Checkout may delegate the calculation of taxes to a tax component and the calculation of shipping costs to a delivery component. A pricing component may enable merchants to create discount codes. Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In some embodiments, the payment gateway 106 may accept international payment, such as integrating with leading international credit card processors. The card server environment may include a card server application, card sink, hosted fields, and the like. This environment may act as the secure gatekeeper of the sensitive credit card information. In some embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In some embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that doesn't provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips.

The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Automated Inventory Record Generation

As noted above, in a variety of contexts, including e-commerce platforms, an administrator or other inventory management user may need to build a set of records reflecting physical items. These may reflect items currently in inventory or that are part of the potential inventory, e.g. physical items that may be inventory now or in the near future, such as current product offerings from a retailer, some of which are in stock and some of which may be temporarily out of stock. In some cases, a built set of records needs to be regularly modified to remove items no longer part of the inventory of physical items or to add new items.

Figure 3:
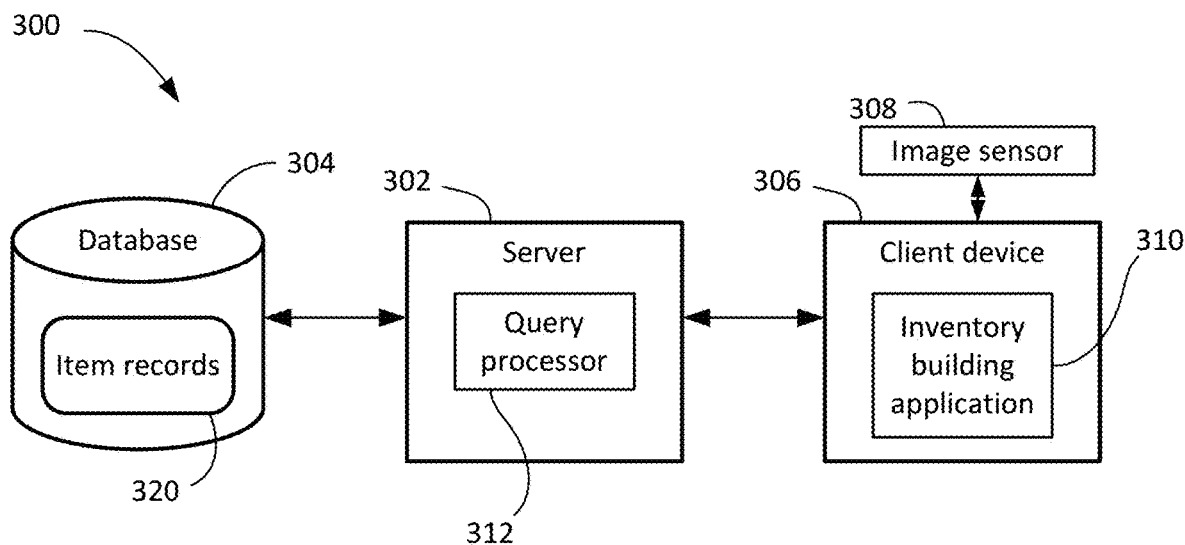
FIG. 3 shows, in block diagram form, one example of an inventory management system.

In accordance with one aspect of the present application, an inventory management system enables at least partly automated building of a set of item records using image analysis. FIG. 3 shows, in block diagram form, one example of an inventory management system 300. In this example, the inventory management system 300 may include a server 302 coupled to a computer-readable storage media, such as a database 304. The database 304 may be implemented within the same computing device(s) as the server 302 or on a separate computing device(s). The inventory management system 300 may include a client device 306. The client device 306 may be coupled to, or may incorporate, an image sensor 308. The image sensor 308 may be a camera in some implementations.

The client device 306 is a computing device and may, in some implementations, include a mobile device, such as a smartphone, tablet, laptop, or the like. The computing device includes one or more processors, memory, communications subsystems, input and output devices, at least one display, and a power source. The memory may store software, including an operating system and applications software. The applications software may include an inventory building application 310 configured to, when executed by the one or more processors, cause the computing device to obtain one or more images from the image sensor 308 and build one or more product item records. The process carried out by the computing device may reflect operations detailed in one or more of the methods described below.

The client device 306 and the server 302 communicate over one or more wired and/or wireless networks, which may include private networks, the Internet, various WLANs, WWANs, or the like.

The server 302 may be implemented using one or more computing devices having one or more processors and suitable software, such as operating system software and other processor-executable software. In some cases, the server 302 may include database software for implementing and managing the database 304, including creating and storing records in the database, removing or deleting records from the database, and executing queries to identify and read records from the database. In this respect, the server 302 may include a query processor 312 configured to receive one or more queries from remote devices, such as the client device 306, and to carry out query operations to identify records in the database corresponding to the query and to return query results. The query processor 312 may be implemented as part of database management software or, in some cases, may be a standalone application. The database 304 may be made up of a large plurality of item records 320.

Figure 4:
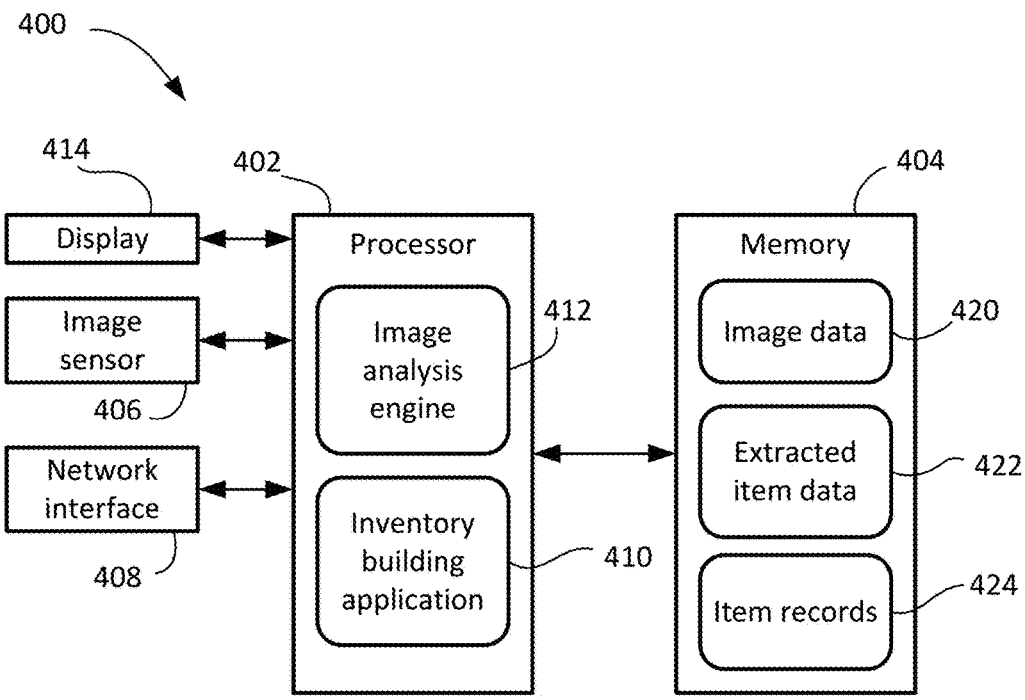
FIG. 4 shows, in block diagram form, one simplified example of a client device in an inventory management system.

FIG. 4 shows, in block diagram form, one simplified example of a client device 400. The client device 400 may be a mobile computing device in some embodiments, such as a smart phone, laptop, tablet, or the like. The client device 400 includes a processor 402 and memory 404. It may further include a network interface 408. The network interface 408 may be wired or wireless and may enable the client device 400 to communicate with remote devices over one or more computer networks, using technologies such as WLAN communications (e.g., IEEE 802.11 "WiFi"), 3G/4G/5G WWAN communications, short-range communications (Bluetooth™), or other such technologies and/or protocols.

The client device 400 includes an image sensor 406, which in some implementations may include one or more camera devices, such as CMOS image sensors, for capturing image data. The camera may operate under control of camera software executed by the processor 402 to control operation of the camera. In some cases, the camera may capture a still image, which the processor 402 may analyze and/or store in the memory 404. In some cases, the camera may capture video images, which the processor 402 may analyze and/or store in the memory 404. In some cases, the camera software may enable operation of the camera in a "viewfinder" or "live preview" mode, in which a stream of image data is available to the processor 402 for analysis and/or for display on a display 414. In some cases, the image sensor 406 may include more than one camera. In some cases, the image sensor 406 may include light sensors outside the visible light spectrum. In some cases, the image sensor 406 includes a LiDAR sensor.

The client device 400 may include processor-executable software for implementing and controlling device functions and operations. Operating system software may implement basic device functions and applications software may implement more specific functionality. Among the applications software, the client device 400 may include an inventory building application 410 and an image analysis engine 412. In some cases, the image analysis engine 412 is implemented as part of the inventory building application 410.

Image data 420 captured by the image sensor 406 may be stored in the memory 404.

In operation, the client device 400 enables building of inventory records for a plurality of physical items. The client device 400 obtains an image using the image sensor 406 and the image analysis engine 412 identifies a physical item in the image. The physical item may be identified by the image analysis engine 412 using feature detection and/or extraction. In some cases the image analysis engine 412 may use a scale-invariant feature transform (SIFT) algorithm or another feature detection algorithm to identify a physical item in the image. The identification of the physical item may be guided by pre-selected categories of item types. For instance, in the case of a grocery retailer, the algorithm may be configured to detect features that tend to correspond to the shapes of typical grocery items. In one example, the algorithm may be trained in particular to recognize boxes, bottles, container shapes, bags, and other typical packaging shapes. In a further example, the algorithm may be trained to detect and recognize text matter, labels, price stickers, barcodes, graphic images, or other common visual features associated with retail packaging. In some cases, the algorithm may be configured to detect differences between objects; that is, to classify or determine whether detected objects are the same or are different. For instance, the algorithm may recognize certain shapes/sizes as being the same (the same sized boxes, for example) and other shapes/sizes as being different from those boxes (e.g. bags or boxes of a different size or shape).

When the inventory building application 410 and, in particular, the image analysis engine 412, identifies a physical item in the image with sufficient confidence, e.g. measured against a minimum confidence threshold value, then item data is extracted from the portion of the image associated with the physical item. The extracted data may include detected text, label, barcode, pricing, or other identifying information printed on the identified physical item. The extraction may employ optical character recognition (OCR), image recognition/matching, barcode reading and lookup, feature detection/recognition, or other such techniques. In some cases, the engine 412 may be configured to extract item data from an area near the physical items. For example, in the case of shelved items, the shelving unit may have associated labeling containing information regarding the physical item. In a grocery example, a physical item may be identified on a shelf that has a label underneath the item providing information regarding the name of the physical item, its barcode, a SKU number, a price, or other such information. In another example, a physical item hung from a hook or other retail display hanger may have an associated hang tag or display sign nearby.

Extracted item data 422 may be stored in the memory 404. In some cases, the image data 420 includes an image of the physical item and the image data 420 and extracted item data 422 may be stored in association with an identifier for the physical item. In some cases, the image data 422 is a cropped portion of the image captured by the image sensor 406, where the image is cropped to contain the identified physical item.

The inventory building application 410 may process the extracted item data 422 to determine the category of physical item identified and identify features or information regarding that physical item. Certain elements of the extracted item data 422 may be determined to belong in certain categories of item-identifying information. In some examples, the processing of the extracted item data 422 may identify the category of physical item in terms of its packaging, e.g. box, bag, bottle, etc. The processing may identify the category of the item, e.g. laundry detergent, cereal, rice, etc. The processing may identify a brand of the item, e.g. Shredded Wheat™, Chex™, Cheerios™. The processing may identify a size or weight of the item, e.g. 1 litre, 255 mL, 450 grams, etc. The processing may identify a sub-brand of the item, e.g. chocolate, strawberry, whole-wheat, etc. The processing may identify a SKU number, a barcode number, or other unique code that may be used to obtain information regarding the item from an external database. The processing may include determining whether an extracted item data element meets a confidence threshold for being an item-identifying element within a certain category, such as brand, sub-brand, size/weight, price, etc.

Although the above description indicates that the all image analysis, feature detection and extraction, and item data processing is carried out by the client device 400, in some cases the client device 400 may off-load some portion or all of these operations to a remote server, such as the server 302 (FIG. 3).

The inventory building application 410 may use the extracted item data 422 and any processing thereof to query a local or remote database of item records to determine whether an item record for the identified physical item exists in the database. A local database may be contained in the memory 404, for example, and may include a plurality of existing item records 424 organized and stored in database format. The remote database may include the database 304 (FIG. 3) in some cases. The query may include one or more of the extracted item data elements, such as a brand, packaging type, size, etc.

A response is received to the query that indicates either that no matching item record was found, that a matching item record was located, or that a partially-matching item record was located. The response may include details of the matching or partially-matching item records.

The inventory building application 410 may determine, based on the query response, whether to build a new item record based on the extracted item data 422. If no matching item record is found, then the inventory building application 410 creates a new item record for the identified physical item. The item record may contain some or all of the extracted item data 422 relating to the physical item. In some cases, the new item record may be displayed on the display 414 in an edit mode to enable a user to complete any missing elements, correct any erroneous element, and/or confirm that the new item record should be created and saved. The client device 400 then either saves the new item record locally as one of the item records 424 or saves it in a remote database, such as the database 304 (FIG. 3).

If an existing item record is located, the inventory building application 410 may not create a new item record. In some cases, the inventory building application 410 may cause the display to output a visual indication that the physical item identified in the image has an existing item record. In some cases, the existing item record may be displayed to obtain user confirmation that the identified physical item is in fact the same as the existing item record.

If a partial match is located, then the inventory building application 410 may determine whether the physical item is a variant of the existing item record. That is, the identified physical item may share some characteristics with the existing item record, e.g. brand, but may vary in at least one element, e.g. sub-brand, size, etc. In some cases, such items may be considered variants such that their respective item records are to be linked as variants of a common item. As an example, a cereal box may be identified as having a certain brand such as Cheerios™. An existing item record may be located for Cheerios cereal, but the existing item record may be of the sub-brand "Original", and the identified item may be of the sub-brand "Multi-grain", or they may be of the same brand but in different sized boxes. In such a case, the two items are different items, but are related as variants of the more general item category of Cheerios™ cereal.

The inventory building application 410 may use the display to propose creation of a variant item record with regard to the identified physical item. If affirmative user input is received, then the inventory building application 410 may create and store the new item record as a variant of the existing item record. This may further include modifying the existing item record to link it to the new item records as a variant.

The item records created may include an image of the physical item. The image may be stored in the data structure of the item record or may be stored separately but associated with the item record through a link or other cross-reference. In some cases, the image may be a cropped image obtained from the image captured by the image sensor 406. In another example, the image may be an image that is selected based on a measured and/or expected quality. In a particular example, the image may be one that was previously captured (e.g., possibly during live view) when the distance between the image sensor 406 and the item was detected to be relatively small (e.g., the image sensor was close to the item so it may be expected to fill more of the image frame).

In some cases, as will be further described below, the image data obtained from the image sensor and on which analysis is performed is live preview or viewfinder mode image data, i.e. a stream of live image data from the image sensor. This enables the client device 400 to display real-time feedback and/or prompts to improve the data extraction by improving the image clarity and/or physical image position within the image stream. It may further speed the item record creation through conducting real-time item recognition, data extraction, and item record creation, with on-display feedback and indicators to guide a client device user in manipulating the client device to ensure capture and cataloging of desired physical items.

The inventory management system 300 and client device 400 may be useful in quickly and accurately generating a large catalog of item records for an existing inventory of physical items. In one illustrative example, a brick-and-mortar retailer wishing to establish an online retail presence may use a client device to take one or more images of a display of available inventory, such as may be displayed for sale within a bricks-and-mortar location. In another illustrative example, a retailer having an online catalog of items that change rapidly, may use the system 300 to scan a physical display of available items in a bricks-and-mortar location to identify and create item records for any newly-added items not already in the catalog. In another example, a wholesaler may use the system 300 to take images relating to newly-arrived inventory offloaded from a delivery truck to a distribution warehouse.

Figure 5:
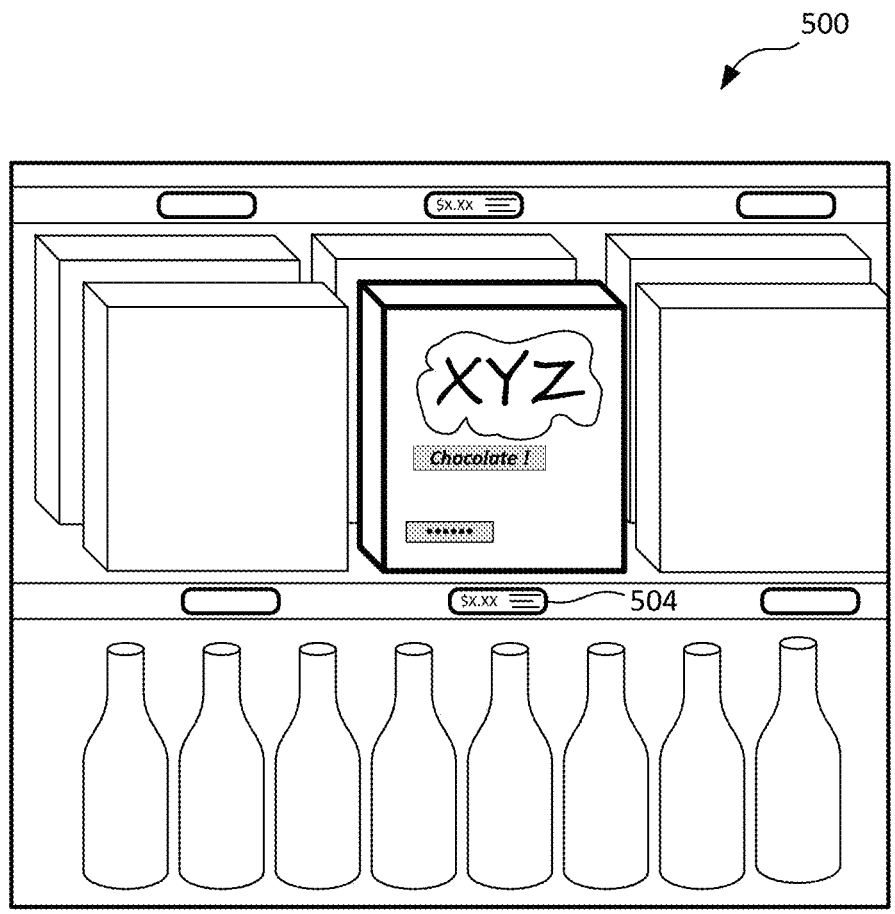
FIG. 5 shows an example image used by an inventory management system to generate one or more item records.

To illustrate by way of example, reference is now made to FIG. 5 which diagrammatically shows an example image 500 of a retail shelf displaying physical items. The image 500 may be captured using an image sensor of a client device. The image 500 may be a static image or may be a frame extracted from a video sequence. The image 500 may be displayed on the display of the client device.

The inventory management system, whether using the client device, the server, or both, analyzes the image to identify features and detect a physical item. In some cases, the system detects multiple physical items.

In this example, the system detects a first physical item, identified using heavier line weight in the image 500. The client device may display an indicator signaling detection of a physical item. In some implementations, the client device may be configured to output a visual and/or auditory indication of a detected physical item. In one example, the client device may be configured to graphically indicate the detected physical item by colouring, adding an outline, highlighting, or otherwise visually identifying the detected physical item in the image 500. In this example, the heavier line weight shown may be applied by the client device as an overlay to the image, perhaps in a notable colour, such as bright red or green.

The system may permit user input with respect to detected physical items, to confirm or refute that they are items of interest. For example, the system may receive, via a touch screen or other such input device, an input indicating that the detected and highlighted item is or is not of interest. Inputs may include taps, swipes, circles, or other such gestures with respect to the identified physical items in the image.

Upon detecting the physical item, the system extracts item data from the image. Extracted item data may include the brand, logo, sub-brand, text data, size information, price information, or other such item identifying data. In some implementations, the extracted data may be textually displayed as an overlay on a portion of the screen. The system may utilize third-party remote databases to obtain additional item data based item-identifying extracted data in some cases. The system may employ text recognition, such as OCR, and/or other image analysis techniques in analyzing the content of the portion of the image containing the physical item so as to extract item data from the image. Image recognition and/or search may be used to extract data regarding the item from a portion of the image; e.g. image matching to identify an extracted logo, symbol, stylized branding or imagery, or other graphics. In some cases, the system may further analyze and extract data from an area near the physical item, such as a shelf label 504.

Figure 6:
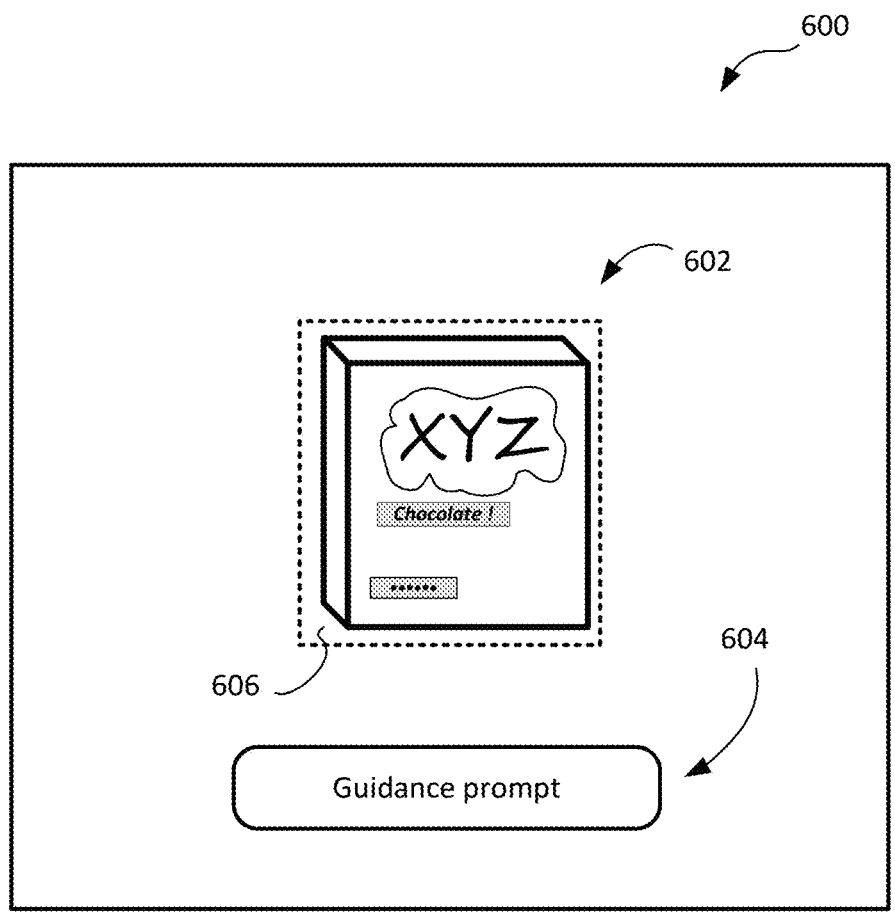
FIG. 6 shows an example display containing a cropped version of the image of FIG. 5.

In some implementations, the system may crop the image 500 to isolate the physical item. FIG. 6 shows one example of a client device display 600 showing a cropped image 602. In some examples, the cropped image 602 may be manipulated by the system to blur or white-out a remaining background portion 606 adjacent to the physical item.

In some implementations, whether showing the full image 500 or the cropped image 602, the client device display 600 may include a guidance prompt 604, which may include text, graphics, or other visual signals to prompt an operator of the client device to improve the quality of image. For example, the guidance prompt 604 may suggest the lighting is too dark or too light, that the camera should be closer to the physical item (e.g. that the physical item is too small in the image), that the background is too busy, or other such image quality issues.

In some cases, the guidance prompt 604 may be generated based on the item data extraction and analysis. For example, the system may extract and analyze available data from the image 500 and may determine that a better image or a different image would be advantageous to obtain additional data. For instance, the guidance prompt 604 may guide the operator to obtain an image of another view of the physical item. In the case where static images are being captured by the image sensor (e.g. camera), as opposed to a live preview stream, the operator may be prompted to capture a photo of a different side of the physical item. In the case of live preview analysis, where the image sensor (e.g. camera) provides a continuous stream of image data from image sensor for analysis and display, the operator may be prompted in real-time on the display to maneuver the camera so as to bring into view a top, side or back view of the physical item, for example. The client device may continually evaluate the feature detection and image quality of the stream of live view data from the image sensor until it determines that one or more certain features are sufficiently detectable. Upon such a determination, the client device may capture an image of that view of the physical item for detailed analysis and data extraction.

In some cases, the guidance prompt 604 may be more specific, such as to capture specific data. As an example, if the data extraction is able to obtain brand, sub-brand and pricing data from the image, but some other expected data is unavailable or unreadable, such as size information, then the guidance prompt 604 may instruct the operator to locate size information on the physical item.

Figure 7:
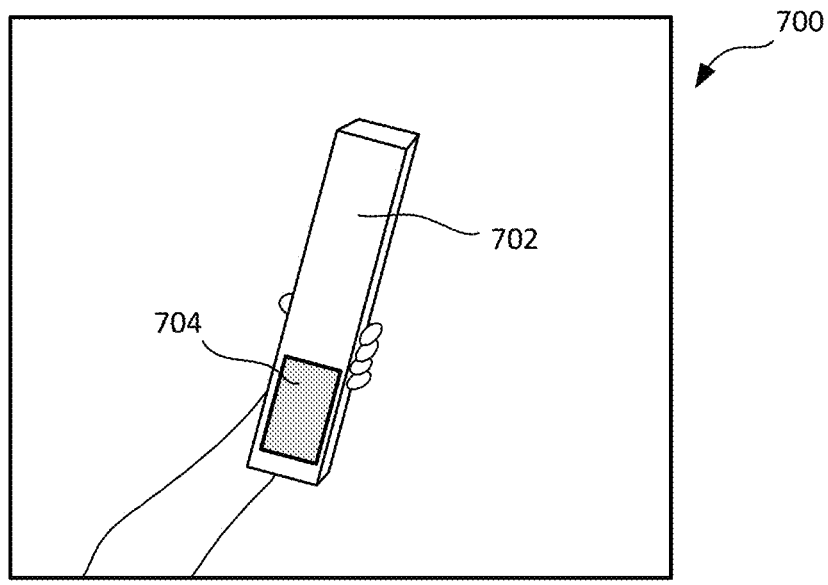
FIG. 7 shows an example display of an alternative item view in an inventory management system.

FIG. 7 illustrates an example of a client device display 700 wherein the operator of the client device has been prompted to capture an image of a side panel 702 of a boxed physical item. The prompt may have instructed the operator to obtain an image of the side panel 702 of the physical item, or may have instructed the operator to obtain an image of a nutrition facts table 704 or other category of information printed on the side panel 702. The system may then extract additional item data from the side view of the physical item to supplement the item data extracted from the image 500 (FIG. 5). If the system determines that particular item information is unavailable from the image, such as, for example, a size indication, a sub-brand label, or other such data, then the system may provide the operator with direction to orient the physical item to make that specific data visible. Advantageously, because the system has output a prompt to the operator to ensure that particular item information is visible in the image, then the image analysis engine can focus feature detection and extraction on that specific item information that the operator was directed to make visible in the image. This may aid in the speed and accuracy of the detection and extraction. In some examples, the operator may be prompted to manipulate the item to make specific features visible that are not visible on the exterior. For example, in the case of clothing, the operator may be prompted to locate a tag or label stitched inside the clothing in order to obtain an image of the internal tag or label.

As noted above, in some cases the system may determine that an identified physical item may be a variant of an item for which there is an existing item record. The previously-identified item may be one for which there is an existing item record in the existing item record database. The previously-identified physical item may also be one for which a new item record was created during the current item record generation session. In some cases, the new item record may have been created based on detection of the previously-identified physical item in the same image in which the current physical item is now detected. That new item record for the previously-identified item may be stored locally on the client device in some cases. In some cases, the new item record is in "draft" or "unconfirmed" form as the operator has not yet been given an option of editing the item record to confirm or correct its contents. This is particularly the case in which images are taken of displayed items in a retail environment since variants are often grouped together for retail display.

Figure 8:
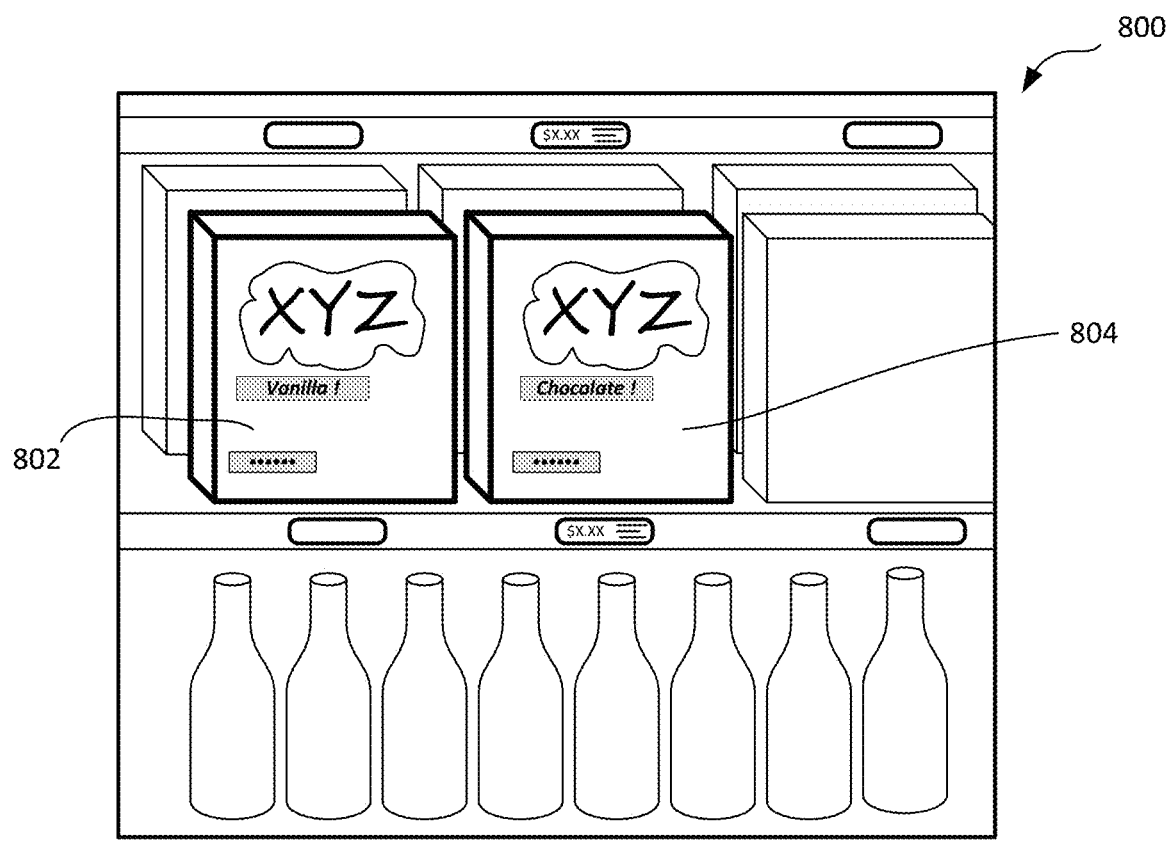
FIG. 8 shows an example display of an image used by an inventory management system to identify variants.

FIG. 8 shows an example of an image 800 of a retail display. In this example a first physical item 802 has been identified. The first physical item 802 may be one for which an item record already exists in the database, or may be one that was identified during the current session and for which a new item record was generated. A second physical item 804 is also identified in the image 800. The system extracts item data from the portion of the image 800 containing the second physical item 804. The system then queries remote and/or local item records to determine whether there is an existing item data record for the second physical item 804. In doing so, the system identifies the item record for the first physical item 802. The system may determine that the extracted data relating to the second physical item 804 is at least a partial match to the item record for the first physical item 802. It may further determine that at least one element of the extracted data does not match the item record for the first physical item 802. On this basis, it may identify the second physical item 804 as a potential variant of the first physical item 802.

The identification of a variant may be based on a match between certain types of elements and a mismatch between certain other types of elements. For example, certain types of elements must match in order for the items to be possible variants. For instance, elements such as the product type, e.g., laundry detergent, cereal, etc., manufacturer, brand, and other such elements may be categorized as necessary matches. Other elements may vary, such as size, sub-brand, or other such features. To illustrate, two ice creams in the same size container and the same flavour (e.g., chocolate) and other common features (e.g., real cream) are not variants if they are from different manufacturers or have different core brands. However, two ice creams in different size containers, or having different flavours, may be variants if they are from the same manufacturer and have the same core brand (e.g., vanilla and chocolate of the same brand). Accordingly, the system may compare certain extracted item data features and, if they do not match, the items cannot be variants, and may compare other extracted item data features that are permitted to vary and at least one of which much vary if the items are to be variants.

The fact that the system has identified two items as potential variants may be signaled on the display. In some implementations, graphical indicia may be rendered on the display in the vicinity or atop the two physical items in the displayed image. For example, the two items may be highlighted, outlined, coloured, or otherwise graphically identified as potential variants.

In one example implementation, an operator may proactively indicate that two items are variants. For example, using a touch screen or other user input, an operator may select one item and then select another item to signal they are variants. In one example, the operator may drag-and-drop one detected physical item from an image onto another detected physical item in the image to indicate that they are variants.

Figure 9:
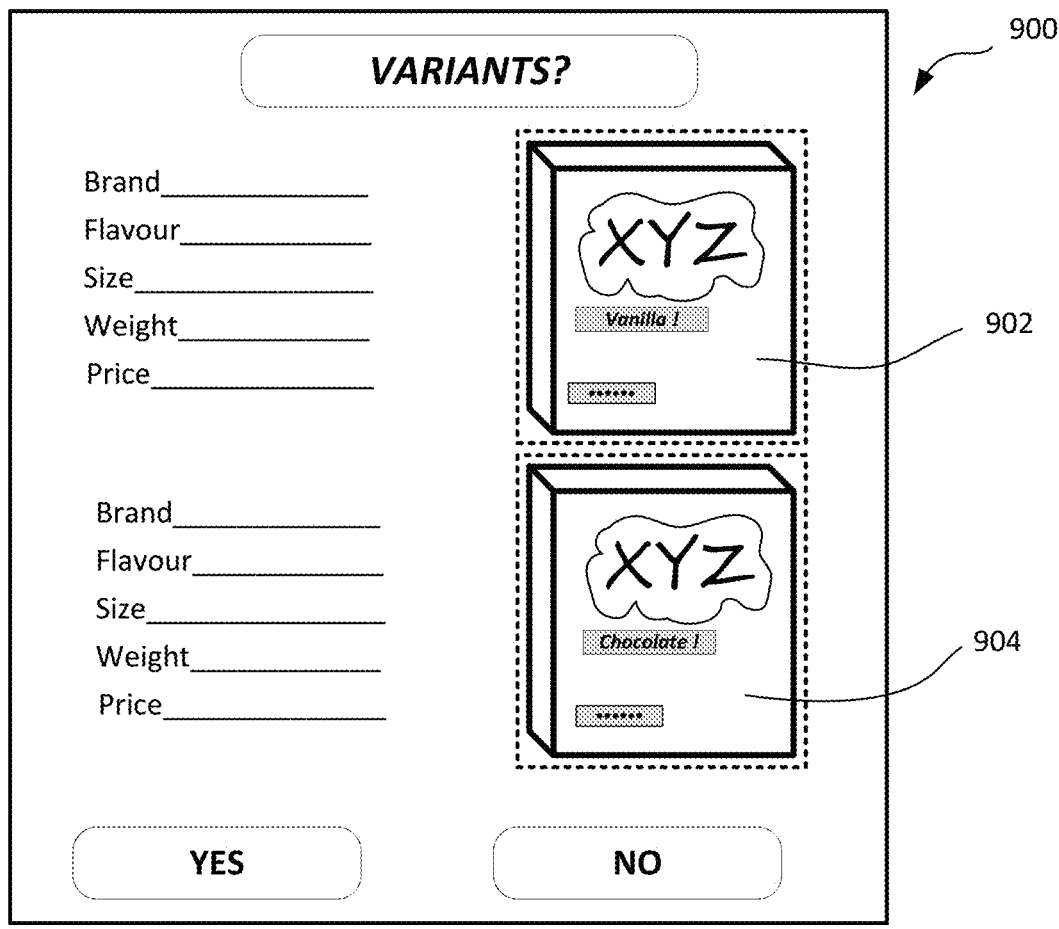
FIG. 9 shows an example display of a variant graphical user interface.

In some cases, having determined that two items are potential variants, the system may actively seek operator input to confirm or refute the determination. FIG. 9 shows an example display 900 that the client device may output to a display screen upon detecting a potential variant. In this example display 900, a first item image 902 and a second item image 904 are displayed. The first and second item images 902, 904 may be cropped images obtained by the client device from one or more images captured by the image sensor.

The first item image 902 may be shown with accompanying first associated extracted data 906 regarding the first item. The first associated extracted data 906 may provide item data elements determined by the system from the image analysis, such as the product type, brand, size, or other such details. The second item image 904 may be shown with accompanying second associated extracted data 908 regarding the second item. Data items that match between the first associated extracted data 906 and the second associated extracted data 908 may be visually indicated, for example with green text or the like. Data items that conflict between the first associated extracted data 906 and the second associated extracted data 908 may be visually indicated, for example with red text, highlighting, or the like, so as to emphasize to the operator the area of divergence between the items.

The display 900 may further provide actionable user input elements, such as a yes button 910 and a no button 912. The yes button 910 may be pressed, tapped, swiped or otherwise selected to indicate that the items are variants, and the no button 912 may be pressed, tapped, swiped or otherwise selected to indicate that the items are not variants. If the no button 912 is selected, a further option may be displayed to indicate whether the items are the same or whether they should be treated as separate items.

If the operator actuates the yes button 910 in this example, the client device receives a signal indicating confirmation that the two items are variants. As a result it may generate the new data record for the second item set so as to indicate it is a variant of the first data item. It may further modify, or instruct the server to modify, the item record for the first item to indicate that it is a variant of the second data item.

Figure 10:
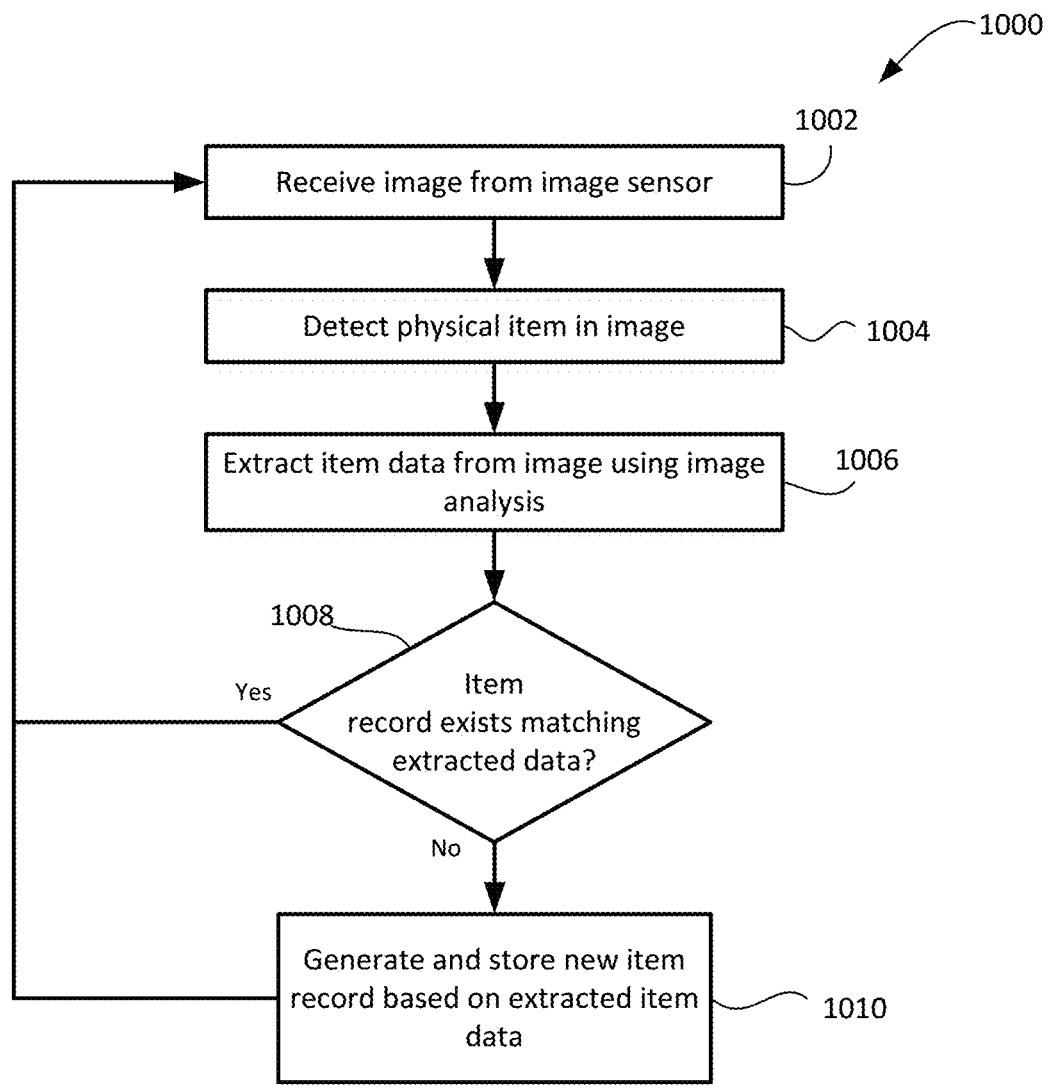
FIG. 10 shows, in flowchart form, an example method of generating item records from an image.

Reference will now be made to FIG. 10, which shows, in flowchart form, one example method 1000 for generating item records. The method 1000 may be implemented by a computing device having suitable computer-executable instructions for causing the computing device to carry out the described operations. The method 1000 may be implemented, in whole or in part, by a mobile computing device, such as the client device 400 (FIG. 4). In some implementations, the client device 400 (FIG. 4) may off-load some operations of the method 1000 to an external device, like the server FIG. 3).

The method 1000 includes receiving an image from an image sensor in operation 1002. The image sensor may be a camera, and the camera may be integrated within the computing device. The image may be a still image in any suitable image format. The image may be a frame from a video stream.

In operation 1004, a physical item is detected in the image. The detection of the physical item may employ feature detection, and may, in some cases, be guided by a set of defined shapes or features that are associated with expected physical items. Examples may include boxes, cans, bottles, cartons, bags, or other such retail packaging. In the example case of a clothing retailer, the example physical items may be clothing shapes. The feature detection may include any suitable technique for identifying edges, blobs, corners, and may obtain feature descriptors or feature vectors relating to identified patches of interest in the image. The feature descriptors may be analyzed through attempting to match the feature descriptor with a library or database of features. The analysis may use scale-invariant feature transforms (SIFT) or other such image analysis techniques for mathematically describing local features and comparing them to entries in a database of features in order to try to recognize an object. Various computer vision techniques may be employed in implementing feature detection.

Once the physical item is detected in the image, then in operation 1006 data regarding the item is extracted from the image. The data extraction may include further feature detection aimed at, for example, logos or graphics in the area of interest. In some cases, text recognition algorithms, like optical character recognition (OCR), may be employed to extract text from the portion of the image containing the physical item. In some cases, feature detection may be employed to identify an associated label, shelf tag, hang tag, or other identifying data regarding the physical item that is visible in the image but adjacent to the physical item. The computing device may interpret and categories extracted data. In part, the categorization may be based on where the data was extracted from relative to the physical item. For instance, text extracted from a shelf label may be correlated with text on the physical item to improve the accuracy of identifying an item brand or name. Text may be correlated to known brands or manufacturers to assist in identifying the category of item.

In some cases, a cropped image of the item or a portion of the item may be used in an image-based search of a third-party database to identify the item and obtain associated information regarding the item.

The data extracted from the image may be associated with levels of confidence. That is, the computing device may compute a confidence metric for each data item extracted in terms of its likely category and/or accuracy. As an example, data extracted from the front panel of a box that includes numbers followed by a symbol for ounces, grams, or other measures of weight or quantity may be determined by the computing device to be indicative of the size/quantity of the physical item with high confidence. Data extracted from the front panel that includes OCR'd text printed in elaborate graphic font may be determined by the computing device to be indicative of the main brand of the physical item, but with less confidence because of the difficult font and the large variation in content and style for brands versus size/weight indicators. The confidence metric may be improved based on detection of correlated or corroborative data. For instance, detecting the same or a very similar logo or brand on a side panel may reinforce the categorization of the data as relating to the product brand.

In some cases, the image analysis for data extraction and categorization may employ a machine learning engine. The machine learning engine may be implemented within the computing device used by the operator in some cases. The machine learning engine may be implemented by a remote server in some cases. Additionally or alternatively, a model built by a remote server may be downloaded to the computing device used by the operator to allow for real-time use (e.g., to avoid communications overhead/latency). The refinement of the machine learning engine may be based on feedback obtained by receiving operator confirmation or rejection regarding identified physical items, e.g., whether the identified item is or is not a physical inventory item. In some cases, the feedback may be operator confirmation or rejection of extracted data, e.g. whether the extracted data is relevant or not as product data. In some cases, the feedback may be operator confirmation or rejection of categorization of extracted data, e.g., whether extracted data is a product type, product name brand, product sub-category or sub-brand, etc.

Data that is extracted but for which the computing device has an associated confidence metric below a threshold may be discarded or may be flagged as potentially incorrect.

In operation 1008, the computing device compares the extracted data with existing item records to determine whether the physical item has an associated item record. The comparison may be carried out by the computing device based on a local database of item records in some cases. In other cases, a remote server may carry out the comparison using a remote database of item records. If a matching record is found, the method 1000 may return to operation 1002 to analyze a further image. If a matching record is not found, then in operation 1010 the computing device may generate and store a new item record containing the extracted data.

In some cases, the computing device or remote server only concludes a match is found if all extracted data elements match the existing item record. In some cases, the computing device or remote server concludes a match is found if all high-confidence extracted data elements match the existing item record. In some cases, if any data element conflicts with an element in the existing item record, or if any data element is not found in the existing item record, then the computing device may seek operator input on whether the detected physical item matches the existing item record. In some cases, the computing device may seek operator confirmation regarding creation of the new item record in all cases. The computing device may display the new item record to obtain either confirmation to proceed, instructions to delete, or edits to the new item record content.

Figure 11:
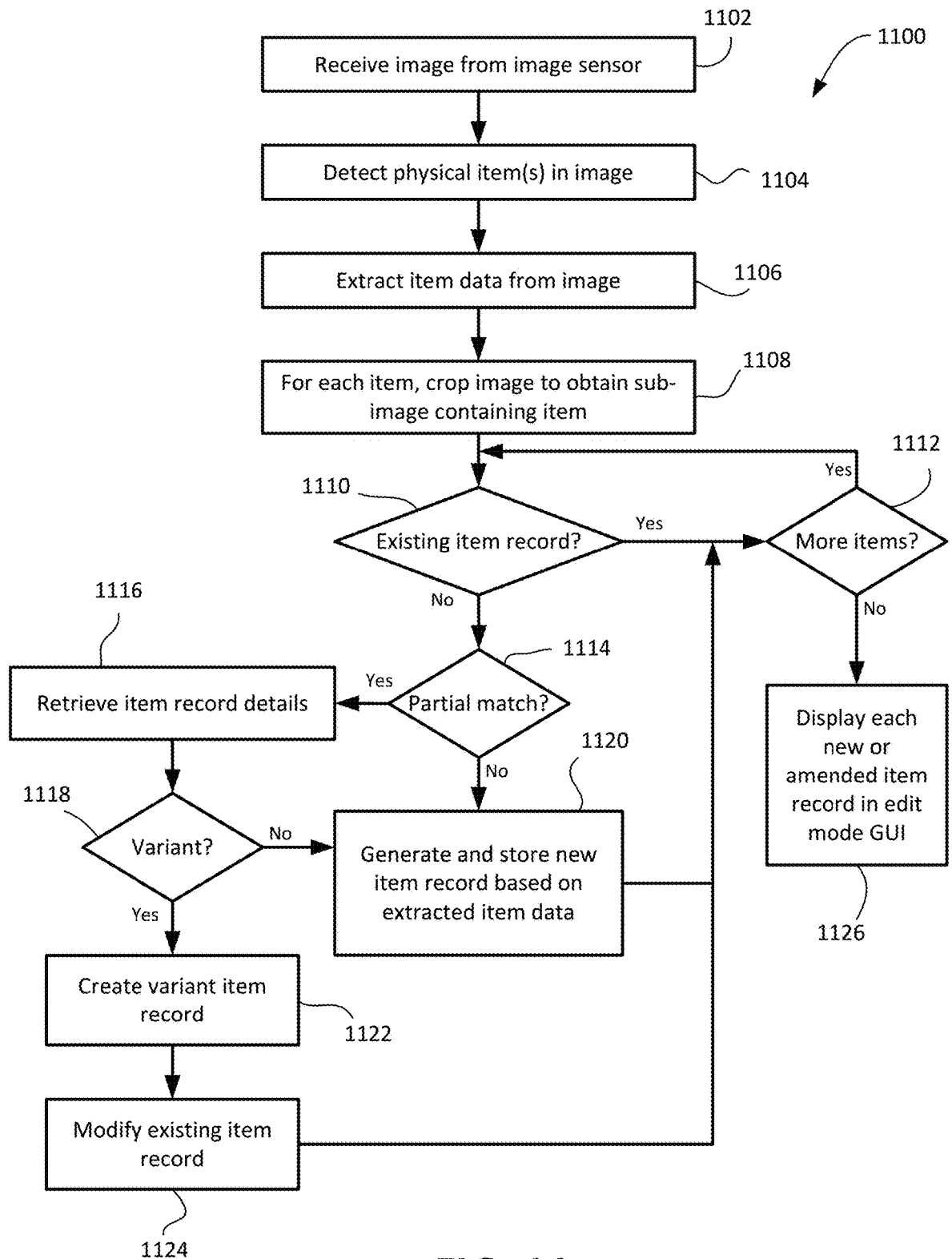
FIG. 11 shows, in flowchart form, another example method of generating item records from an image.

Reference is now made to FIG. 11, which shows a further example method 1100 of automatically building a database of physical items. The method 1100 may be implemented by a computing device having suitable computer-executable instructions for causing the computing device to carry out the described operations. The method 1100 may be implemented, in whole or in part, by a mobile computing device, such as the client device 400 (FIG. 4). In some implementations, the client device 400 (FIG. 4) may off-load some operations of the method 1100 to an external device, like the server 302 (FIG. 3).

In operation 1102 an image is received by the computing device from an image sensor, and in operation 1104 the computing device detects one or more physical items in the image. The computing device then extracts data associated with each detected physical item from the portion of the image containing that detected physical item in operation 1106. Details regarding various implementation options with regard to detection of the physical items and extraction of data associated with the physical items are discussed above in connection with FIG. 10.

In this example method 1100, in operation 1108 the computing device crops the image to obtain a cropped sub-image containing the detected physical item. A cropped version of the image may be created for each detected physical item. The cropped image may be used in data extraction in some cases. The cropped image may be used in an image-based search of third-party data repositories for data associated with the physical item. The cropped image may be adjusted or manipulated by the computing device, such as to blur or white-out background portions adjacent to the physical item, in some cases. The cropped image may be stored in memory in association with the data extracted regarding the physical item. In some implementations, one or more images may be captured (e.g., from the live view) and may be employed in generating one or more cropped images for processing. Additionally or alternatively, it may be that at least one image is captured at a higher quality than may be otherwise captured/generated (e.g., higher than the quality used for the live view) for use in generating the cropped image(s). For example, the image sensor may be used to capture at a higher resolution than is used for the live view and/or additional post-processing may be performed on the captured image(s) to improve quality.

In operation 1110, the computing device determines whether there is an existing item record for the detected physical item. The computing device may query a local database or may query a remote server that maintains and manages a remote database of item records. If a matching item record is located, i.e. the item record contents matches the extracted data regarding the physical item, then the method may proceed to operation 1112, in which the computing device determines whether there are further items to be evaluated. If so, it cycles back to operation 1110.

If no matching item record is located, then in operation 1114, the computing device determines whether a partial match has been detected. If not, then it may create a new item record for the physical item containing the extracted data in operation 1120; however, if a partial match is located then the computing device retrieves details of the partially-matched item record in operation 1116, if it does not already have them. The computing device then, in operation 1118, determines whether the detected physical item is a variant of the item in the existing item record. The determination may be automatic based on categories of data items matched and unmatched; for example, if the only difference between the extracted data and the existing item record is with respect to size/weight of the item but a sufficient number of other items match, like the brand, manufacturer, etc., then the computing device may automatically determine that the detected item is a variant. In some cases, however, the computing device may seek operator input to determine whether an item is a variant. In such cases, detailed information and/or photos of the existing item and the detected item may be displayed on the computing device and input solicited regarding whether the items are variants are different items.

If the computing device determines that the items are not variants, i.e. that they are different items, then the computing device generates a new item record for the detected physical item in operation 1120. Otherwise, it creates a new item record for the detected physical item that is categorized as a variant of the existing item record, as indicated by operation 1122. Likewise, the existing item record is modified in operation 1124 to categorize it as a variant of the new item record. In some cases, the existing item record may be more than one existing item record that are already labeled as variants of each other. For example, the existing item records may be four different flavour or roasts of a particular brand of ground coffee. The new item record may be a fifth such flavour or roast of the same brand of ground coffee. All five item records are variants of each other.

The new item record and the existing item record(s) may be linked or otherwise associated by containing a common identifier, cross-references to each other variant, or some other link or association within each item record. In another variation, the item records may be structured to permit sub-item records for recording variant details under a parent item record. As an example, the item record may contain much of the common detail regarding the items may include a marker, indicator or other flag in the field regarding "flavour" or "sub-brand" indicating that there are variants of that field. The item record may then further include a variants field for containing the variant details, such the various flavours or sub-brands. In some cases, an item record identifier associated with the item record may have a suffix or other additional code to distinguish between variants of the item when referencing the item record.

Once the computing device creates or amends item records in operations 1120, 1122, and 1124, it then assesses whether there are more items that have been detected in the image in operation 1112. If not, then in operation 1126 the computing device may present each created or amended item record on a display in an edit mode to enable an operator to confirm, cancel, or edit the item records.

Figure 12:
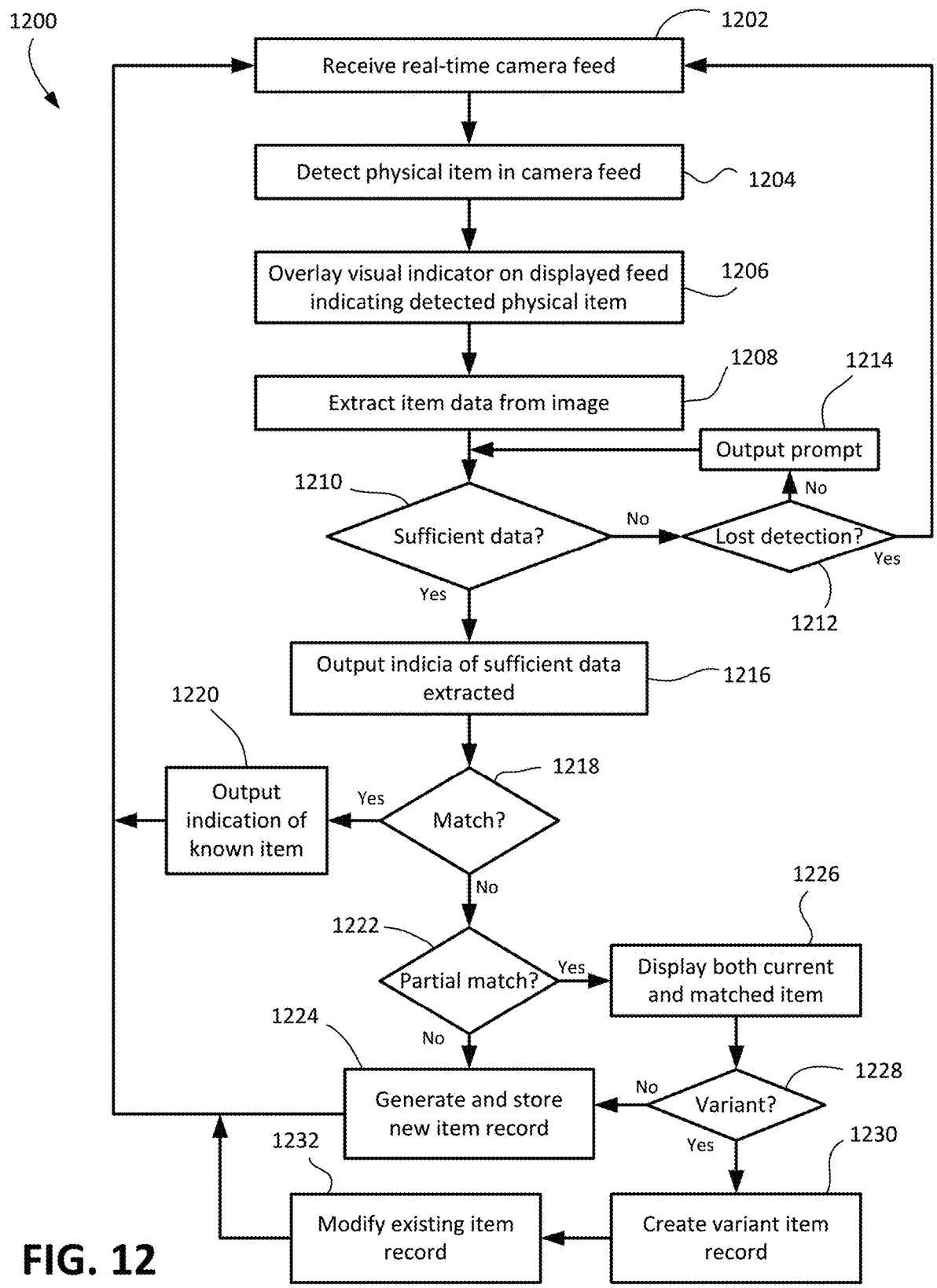
FIG. 12 shows, in flowchart form, a further example method for generating item records from a camera live feed.

FIG. 12 shows yet a further example method 1200 for real-time item record generation. The method 1200 may be implemented by a computing device having suitable computer-executable instructions for causing the computing device to carry out the described operations. The method 1200 may be implemented, in whole or in part, by a mobile computing device, such as the client device 400 (FIG. 4). In some implementations, the client device 400 (FIG. 4) may off-load some operations of the method 1200 to an external device, like the server 302 (FIG. 3).

The method 1200 implements an item record creation process that uses a live view camera feed (sometimes termed a "viewfinder mode" or a "preview mode"). The live view camera feed is obtained from the image sensor and provides real-time data regarding the current view of the image sensor. In some respects, the live view camera feed may be characterized as a stream of images, each image representing a then-current image captured by the image sensor, e.g. a frame of a video stream from the image sensor. In some implementations, during live view, images may be captured at a high frame rate (potentially at a lower quality than the image sensor is capable of providing and/or with less post-processing to improve image quality) in order to provide a preview that is highly responsive to any repositioning of the computing device and/or the image sensor and/or any items in the environment of which images are being captured.

In operation 1202, the processor of the computing device obtains the live view camera feed from the image sensor. In operation 1204, the computing device detects a physical item in the camera feed. The detection of the physical item may include employing feature detection with respect to one or more images in the camera feed to identify the location of the detected physical item and tracking that physical item in subsequent images in the camera feed, in some cases. In some implementations, once an item is detected, a further high quality image may be captured/generated (e.g, where live stream images are captured at a lower quality than the image sensor is capable of providing and/or where post-processing is applied that is not necessarily applied to some or all of the live steam images) and employed in some or all of any subsequent image processing.

In many cases, the live view camera feed is further displayed on at least a portion of a display screen on the computing device. The display of the live view camera feed is sometimes referred to a viewfinder or preview mode, since it enables an operator of the computing device to see the image sensor's field of view and focus in real-time and adjust the position of the computing device and image sensor so as to capture a desired field of view.

In operation 1206, the computing device overlays one or more visual indicators on the display screen with regard to the detected physical item. In some cases, this may include using colour or highlighting to emphasize the area of the detected physical item within the live view display. In some cases, detected edges, corners or other features of the physical item may be colourized or highlighted so as to indicate the physical item within the display. Other graphical indicia may be used to indicate the detected physical item. The graphical indicia are rendered one or directly adjacent to the location of the physical item in the live view camera feed on the display screen.

In one example, once a physical item is detected, it is graphically emphasized or enhanced in a manner to draw an operator's attention to the fact an item has been detected. A sound or other audiovisual cue may be output to signal to an operator that an item has been detected. The sound and or the graphical elements may be associated with an item that has been detected, but for which sufficient item data has not yet been extracted from the image.

In operation 1208, the computing device extracts item data from the image. As discussed above, this may include text recognition, image searches, feature recognition, or other such techniques. As data extraction occurs or is attempted, the computing device may assess whether it has obtained sufficient data. There may be certain elements of data, such as brand, size, etc., that are considered "necessary" and must be identified with sufficient confidence. There may be certain elements of data that are "optional", or for which the device requires n of m elements, or for which the confidence threshold is lower. If sufficient data, howsoever measured, has not yet been extracted or identified with regard to the detected time, the computing device may continue attempting data extraction.

Simultaneously, the computing device may assess, on a more or less continuous basis, whether it has maintained detection of the item in the camera feed. That is, the computing device may assess whether it has lost detection of the item in operation 1212. Detection may be lost if the computing device is moved such that the item is no longer in the field of view, or is partly obscured by another item, etc. If the device is unable to further track the detected physical item, then it may return to operation 1202 to attempt to detect the same or a new physical item in the camera feed. In some implementations, high quality images may be captured/generated (e.g., periodically) for use in processing similar to as was discussed above in relation to the operation 1202.

Assuming detection has not been lost, the computing device may output a prompt as indicated by operation 1214. The prompt may be an auditory or visual cue to the operator. In some cases, the prompt may be textual and may provide guidance to the operator regarding manipulation of the image sensor. For example, the prompt may be a text output to the display guiding the operator to "move closer", or that there is too much or too little light, or that another view of the item is required. In some cases, the prompt may be specific guidance, such as "obtain a view of the back panel", "obtain a view of the interior size label", "focus on the product barcode", or other such instructions. In some implementations, once it is detected that a given piece of guidance has or is likely to have been satisfied, a higher quality image may be captured/generated for use in subsequent processing such as, for example, in manners discussed above (e.g., using the image sensor at a high resolution and/or by performing post-processing on captured image(s)).

Once the computing device determines that it has sufficient data with regard to the detected physical item, then it may output an indication that sufficient data has been obtained. In one example, an auditory output, like a beep, chime, bell, or other signal, may indicate sufficient data has been obtained. In some cases, the display may indicate sufficient data has been obtained. For example, graphical indicia associated with the physical item in the displayed camera view may be modified to indicate the transition from "detected" to "sufficient data extracted". Such a transition in state may be indicated by a change in the colour of the graphical indicia, for example, like a transition from red to yellow or green or the like. This may be accompanied by an auditory signal, like a chime or the like, to further signal the change in state.

In some cases, there may be multiple items detected and being tracked in the live view camera feed. Initially, all may be graphically highlighted or indicated as being detected but not having had data extracted. As data is extracted for sufficient individual items, the graphical change in indicia with respect to those items signals to the operator which items have been sufficiently identified and which require additional data, thereby enabling the operator to focus on positioning the image sensor to better capture those items.

With each captured item for which sufficient data is extracted, the computing device may go through the process of searching for an existing item record in operation 1218. The search may be of a local database of item records or a remote database of item records. If a match is found, then in operation 1220 the computing device may output a signal indicating that the detected item is a known item with an existing item record. For example, the signal may include further changes to the graphical indicia associated with the item, such as a transition from yellow to green, or some other colour. As another example, a graphical icon, such as a check mark or the like, may be overlaid atop the item's location in the display of the live camera feed.

If there is no match to an existing record, the computing device may assess whether there is a partial match in operation 1222 and if not, then it may generate and store a new item records as indicated in operation 1224. The new item record may be displayed in an edit mode in some cases to enable editing by the operator (not shown). In some cases, a further output may be generated to signal creation of a new item record. For example, the graphical indicia associated with the item may be changed, or an icon or other symbol indicative of a new item record may be rendered at the location of the item on the display.

If there is a partial match, then in operations 1226, 1228, 1230, and 1232, the computing device may assess whether the item is a possible variant of the existing item record, may obtain operator input to confirm the item as a variant or to indicate that it is a new item, and may take appropriate steps to create new item records, amend existing item records, and create linkages between item records that are related as variants.

Implementations

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include 4th Generation (4G) networks (e.g. Long Term Evolution (LTE)) or 5th Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The invention claimed is:

1. A computer-implemented method for automatically creating item records for physical items, the method comprising:
   receiving a live view camera feed from an image sensor of a mobile device, wherein the live view camera feed includes frames of video;
   detecting a physical item in one or more of the frames of the video;
   extracting item data regarding the physical item by applying image analysis to the one or more of the frames of the video;
   determining, using the extracted item data, whether a memory contains an item record for the physical item; and,
   when no item record for the physical item exists in the memory, generating and storing in the memory a new item record for the physical item in association with the extracted item data, wherein the generating further includes:
      displaying the live view camera feed in real-time on a display of the mobile device, tracking the physical item in the live view camera feed, and overlaying graphical indicia identifying the detected physical item in the display of the live view camera feed; and
      determining that the extracted item data includes insufficient item data for generation of the new item record and, in response, outputting a prompt on the display regarding the insufficient item data.

2. The computer-implemented method of claim 1, further comprising, after generating the new item record, outputting the new item record to the display in an edit mode to enable editing of the new item record.

3. The computer-implemented method of claim 1, wherein detecting the physical item includes applying a feature detection algorithm to the one or more of the frames of the video.

4. The computer-implemented method of claim 1, wherein applying image analysis includes using text recognition with regard to a portion of the one or more of the frames of the video within which the detected physical item is located.

5. The computer-implemented method of claim 1, wherein applying image analysis includes using feature detection to identify in the one or more of the frames of the video one or more of a brand, a sub-brand, a logo, a barcode, a size value, a weight value, a flavour, a barcode, a stock keeping unit, or a price, associated with the detected physical item, and extracting therefrom the item data.

6. The computer-implemented method of claim 1, wherein detecting the physical item includes detecting two or more physical items in the one or more of the frames of the video and carrying out the extracting, determining, and generating and storing in connection with each of the two or more physical items.

7. The computer-implemented method of claim 1, wherein determining includes identifying a partial match between the extracted item data and an existing item record, determining that the detected physical item is a possible variant with regard to the existing item record.

8. The computer-implemented method of claim 7, wherein determining that the detected physical item is a possible variant includes determining that extracted item data relating to brand matches the existing item record, but that at least one extracted item data relating to size, weight, or sub-brand, varies from the existing item record.

9. The computer-implemented method of claim 7, wherein, in response to determining that the detected physical item is a possible variant with regard to the existing item record, the method includes displaying a graphical user interface on the display prompting input regarding whether the detected physical item is a possible variant with regard to the existing item record and, in response to received input, generating the new item record with a link to the existing item record and modifying the existing item record to link it to the new item record as variants.

10. The computer-implemented method of claim 7, wherein, based on the determination that the detected physical item is a possible variant with regard to the existing item record, generating the new item record includes generating the new item record with a link to the existing item record and modifying the existing item record to link it to the new item record as variants.

11. The computer-implemented method of claim 1, further comprising using one of the frames as an image and cropping the image to obtain a sub-image containing the detected physical item, and storing the sub-image in association with the new item record.

12. The computer-implemented method of claim 11, further comprising altering the sub-image to modify the background around the detected physical item.

13. The computer-implemented method of claim 1, wherein generating further includes extracting further item data and determining that the extracted item data and the further item data include sufficient item data and, in response, outputting a signal from the mobile device indicating that sufficient item data has been extracted for generation of the new item record.

14. The computer-implemented method of claim 1, wherein the memory is contained within mobile device and wherein the determining includes searching the memory on the mobile device.

15. The computer-implemented method of claim 1, wherein the memory is located on a remote server, and wherein the determining includes sending a search query from the mobile device to the remote server and receiving a response message.

16. The method claimed in claim 1, wherein outputting a prompt on the display includes displaying guidance regarding movement of the image sensor.

17. The method claimed in claim 1, wherein outputting a prompt on the display includes displaying an instruction to obtain a view of a characteristic of the physical item.

18. The method claimed in claim 13, wherein overlaying graphical indicia includes displaying first graphical indicia associated with the detected physical item based on the insufficient item data and transitioning to second graphical indicia associated with the detected physical item based on the determination that the extracted item data and the further item data include sufficient item data.

19. A mobile computing device to automatically create item records for physical items, the device comprising:
  one or more processors;
  an image sensor to capture and provide a live view camera feed including frames of video to the one or more processors; and
  a processor-readable storage medium containing processor-executable instruction that, when executed by the one or more processors, are to cause the one or more processors to:
    detect a physical item in one or more of the frames of the video,
    extract item data regarding the physical item by applying image analysis to the one or more of the frames of the video,
    determine, using the extracted item data, whether a memory contains an item record for the physical item, and,
    when no item record for the physical item exists in the memory, generate and store in the memory a new item record for the physical item in association with the extracted item data, wherein the processors are to generate the new item record at least in part by:
      displaying the live view camera feed in real-time on a display of the mobile device, tracking the physical item in the live view camera feed, and overlaying graphical indicia identifying the detected physical item in the display of the live view camera feed; and
      determining that the extracted item data includes insufficient item data for generation of the new item record and, in response, outputting a prompt on the display regarding the insufficient item data.

20. A non-transitory computer-readable medium storing processor-executable instructions for automatically creating item records for physical items, wherein the instructions, when executed by one or more processors, are to cause the one or more processors to:
  receive a live view camera feed from an image sensor of a mobile device, wherein the live view camera feed includes frames of video;
  detect a physical item in the in one or more of the frames of the video;
  extract item data regarding the physical item by applying image analysis to the one or more of the frames of the video;
  determine, using the extracted item data, whether a memory contains an item record for the physical item; and,
  when no item record for the physical item exists in the memory, generate and store in the memory a new item record for the physical item in association with the extracted item data, wherein the processors are to generate the new item record at least in part by:
    displaying the live view camera feed in real-time on a display of the mobile device, tracking the physical item in the live view camera feed, and overlaying graphical indicia identifying the detected physical item in the display of the live view camera feed; and
    determining that the extracted item data includes insufficient item data for generation of the new item record and, in response, outputting a prompt on the display regarding the insufficient item data.

* * * * *